United States Patent [19]

Esaki

[11] 4,190,880
[45] Feb. 26, 1980

[54] PHOTOGRAPHIC FLASH DEVICE

[75] Inventor: Koreaki Esaki, Suita, Japan

[73] Assignee: West Electric Company, Ltd., Osaka, Japan

[21] Appl. No.: 925,629

[22] Filed: Jul. 17, 1978

[30] Foreign Application Priority Data

Jul. 27, 1977 [JP] Japan ................................. 52/90739

[51] Int. Cl.² ...................... G03B 15/02; G03B 15/05; G03B 7/08; G03B 7/16
[52] U.S. Cl. ........................................ 362/18; 354/33; 354/35; 354/145; 362/4; 362/16; 362/255; 362/280; 362/281; 362/282; 362/283; 362/285; 362/287; 362/319; 362/323
[58] Field of Search ....................... 362/3, 4, 7, 10, 16, 362/18, 277, 280–283, 319, 255, 285, 287, 322, 323; 354/145

[56] References Cited

U.S. PATENT DOCUMENTS

| | | | |
|---|---|---|---|
| 2,309,104 | 1/1943 | Dircksen et al. | 362/277 |
| 2,811,907 | 11/1957 | Hyzer | 362/319 |
| 3,869,604 | 3/1975 | Prochnow | 362/18 |
| 3,882,514 | 5/1975 | Graham | 362/4 |
| 3,967,106 | 6/1976 | Chen | 362/4 |
| 4,017,727 | 4/1977 | Yamamoto | 362/16 |
| 4,078,240 | 3/1978 | Kaneko et al. | 362/4 |
| 4,109,301 | 8/1978 | Wakimura | 362/7 |
| 4,141,059 | 2/1979 | Shiojiri | 362/16 |

FOREIGN PATENT DOCUMENTS

| | | | |
|---|---|---|---|
| 49-26530 | 3/1974 | Japan | 362/3 |
| 488472 | 7/1938 | United Kingdom | 362/277 |

Primary Examiner—Benjamin R. Padgett
Assistant Examiner—T. S. Gron
Attorney, Agent, or Firm—Cushman, Darby & Cushman

[57] ABSTRACT

A photographic flash device comprising a first mechanism for varying the angle of divergence of a flashed light and a second mechanism for varying the direction of the flashed light. The first variable mechanism is provided with a first body having a light source, a second body, a first slidable molding which has an optical panel to cover the front of the light source, a second slidable molding which surrounds the first slidable molding, and detent means which control slide movement of the first slidable molding and connects the first slidable molding with the first body. The second variable mechanism changes the direction of the flashed light from the light source by rotatably connecting the moldings to an additional body.

3 Claims, 5 Drawing Figures

PHOTOGRAPHIC FLASH DEVICE

BACKGROUND OF THE INVENTION

1. Field of Technology

The present invention relates to a photographic flash device (hereinafter referred to as a strobo) having mechanisms for varying the illumination angle and illumination direction of a flash light.

2. Prior Art

A strobo is currently used as an artificial light source for photography. Recently such a strobo has been used for special photography, namely a bounce photography with bounce flashing and a photography in which the divergent angle of the flash light is variably changed. A bounce mechanism is disclosed in U.S. Pat. No. 4,078,240 assigned, to West Electric Co., Ltd., wherein a first main part including a light emitting part is rotatively connected with a second part which includes an electronic circuit. A Variable mechanism for changing the divergent angle of a flash light is disclosed in U.S. Pat. No. 4,017,727 issued to D. J. Yamamoto. The variable mechanism has an elongated bar demountably coupled to a photo flash unit with the bar carrying a clamping head, in which a fresnel lens is mounted in such a manner as to be situated inside the light path of the strobo.

Heretofore, these two variable mechanisms have not been embodied together in one strobo device, and therefore, two different kinds of strobos had to be used to obtain the abovementioned special photography effects.

SUMMARY OF THE INVENTION

The object of the present invention is to provide a photographic flash device (strobo) capable of undertaking both bounce flash photography and photography wherein divergent angles of a flash light are changed. Such an arrangement obviates the use of two kinds of strobos.

DETAILED DISCLOSURE OF THE INVENTION

Figure 1:
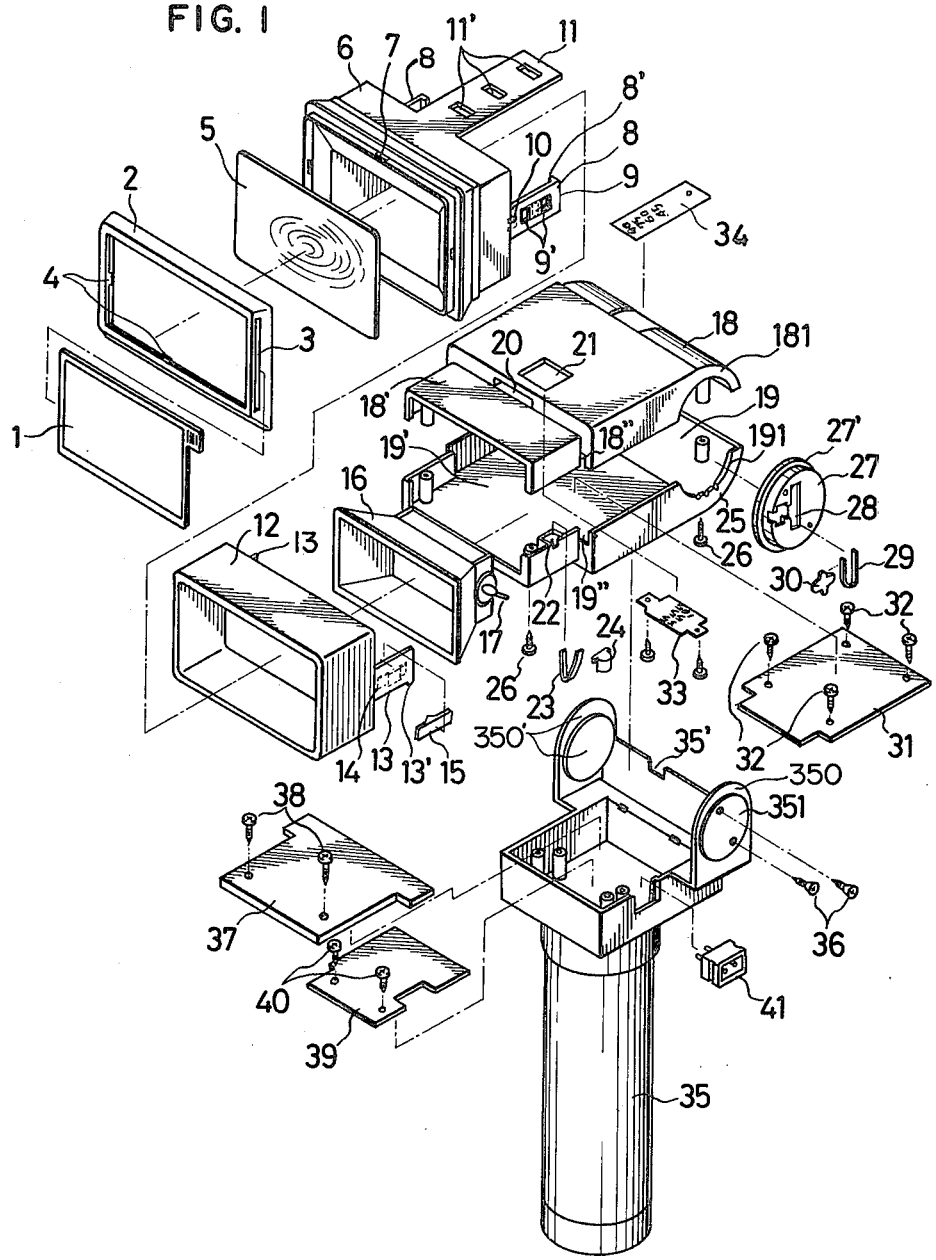
FIG. 1 is an exploded view of a strobo in accordance with the present invention.

In FIG. 1, a panel 1 (such as a wide panel or a color temperature conversion panel) is inserted in a panel slot 3 provided in a cover 2. The cover 2 is fixed in front of a first slidable molding 6 by a locking engagement achieved between a projecting detent 4 and a detent receiving dimple 7. An optical panel 5, for example a fresnel lens, is held by being pressed between the cover 2 and the first slidable molding 6.

The first slidable molding 6, which comprises a pair of click guide levers 8 and a lever 11 having indicator openings 11', is positioned within main moldings 18 and 19 and passes through the interior opening of a second slidable molding 12 having a pair of slidable control arms 13.

Each click guide lever 8 comprises a groove 9 on an outer face thereof, namely the surface shown in FIG. 1, two detent notches 9' in the groove 9, three detent notches 10, and a detent projection 8' on an interior face of the lever. This detent projection 8' is slidably received in the main moldings 18 and 19 by means of slot 18" for the click guide lever 8. Slot 19" for the slidable control arm 13 of molding 12 is provided in such a manner that the first slidable molding 6 does not separate from the strobo main body during slide action.

Each slidable control arm 13 comprises a detent projection 13' at the tip thereof, and a notch 14 is provided in the inner surface of arm 13 to receive a click pin 15. A tip of the click pin 15 having an elastic force projects beyond the inner surface of arm 13. The tip of this click pin 15 engages the groove 9 formed on the outer surface of the click guide lever 8, and the second slidable molding 12 thereby is detained by the detent notches 9'. The detent projection 13' is hooked in the main molding 19 by means of slots 18" and 19" in the same manner as the hooking of the detent projection 8' of the click guide lever 8 in order that the slidable mold 12 will not separate from the body of the strobo.

A reflection mirror 16 comprising a flash discharge tube 17 is housed in front parts 18' and 19' of the main moldings 18 and 19 to form a light source section. Inside the main moldings 18 and 19 a printed substrate 31 is fixed by screws 32. Parts (not shown) of the electric circuits of the strobo are disposed on substrate 31. A rotation guide disk 27 with an annular flange 27' is provided within mating semicircular openings 181 and 191 in the main moldings 18 and 19 whereby the moldings are pivotally movable with respect to disk 27 to change direction of the light flashed from the strobo.

The main molding 18 is provided with a slot 20, an indication window 21 and a seal 34 bearing indication marks. An indication plate 33 is secured within moulding 18 adjacent opening 21. The lever 11 of the first slidable molding 6 is inserted into the slot 20 to pass over plate 33. Consequently the angles of divergence marked on the indication plate 33 are selectively displayed through the windows 11' of the lever 11 and through the window 21.

A click spring 23 and a click pin 24 are provided in a recess 22 the front part of the main molding 19 to control the slide of the first slidable molding 6. Detent notches 25 are formed along the semicircular opening 191 on the side of the main molding 19.

The two main moldings 18 and 19 are joined together by a screw 26 in such a manner that the rotation guide disk 27 is positioned as stated previously between the main moldings 18 and 19 such that the interior of the molding adjacent openings 181 and 191 engage flange 27' which has a slightly larger diameter than that of the round opening formed by the semicircular openings in main moldings 18 and 19. The rotation guide disk 27 includes a click spring 29 and a click pin 30 in a recess 28 formed in the disk, and the disk, and is fixed to the upper side wing 350 of a main molding 35 by a cover 351 and by screws 36. Similarly, the another rotation guide disk 27 is fixed to a side wing 350' on the opposite side of the molding 35 from the upper side wing 350. The main moldings 18 and 19 which form the light source section are rotatably mounted on the main molding 35 by means of the rotation guide disk 27, and the angle of divergence of the flashed light is controlled by the click pin 30 selectively engaging the detent notches 25.

The click pin 24 provided in the recess 22 of the front part 19' of the main molding 19 selectively engages three detent notches 10 formed on the inside face of the click guide lever 8 of the first slidable molding 6 in such a manner that movement of the first slidable molding 6 is slidably controlled.

Inside the main molding 35 a printed substrate 39 is fixed by screws 40, the substrate being supplementary to the printed substrate 31 and having circuit parts (not shown) constituting additional electric circuits for the strobo. A cover 37 is fixed by screws 38 to molding 35 to protect the printed substrate 39. Electric power is supplied to the circuits of the strobs by a power supply socket 41. Although not shown in the drawings, it is obviously possible to obtain a strobo capable of known automatic light adjustment, when a socket for an external light sensor also is provided.

Figure 2:
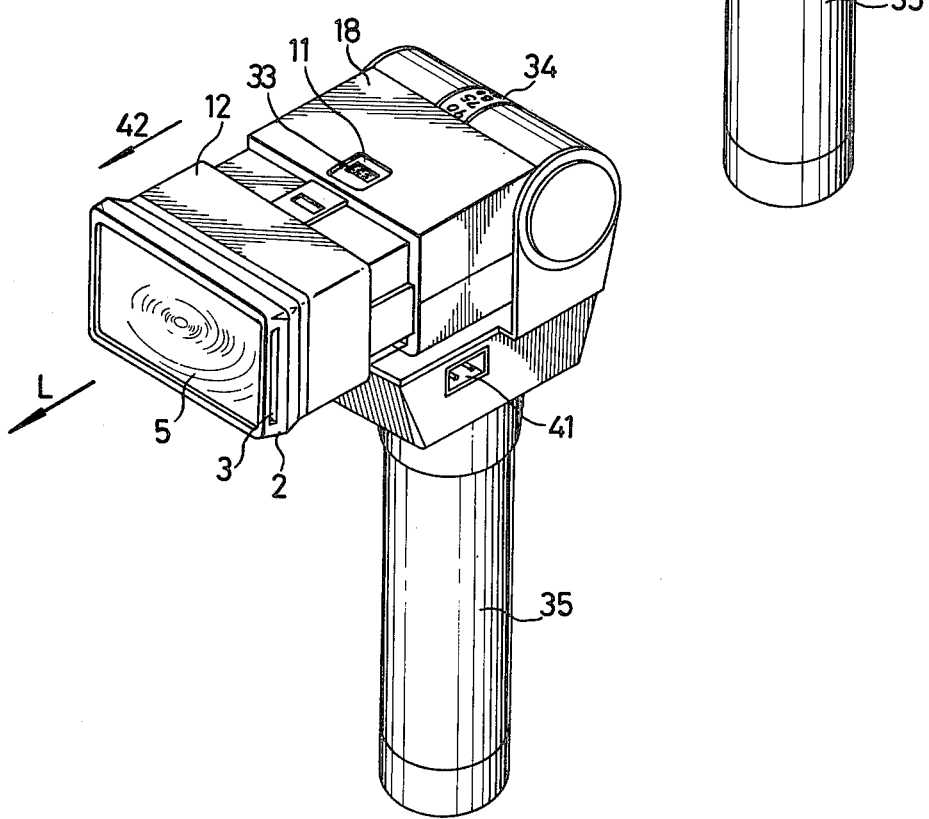
FIG. 2A is a perspective view of the strobo arranged in accordance with the present invention, wherein the divergent angle of a flash light and a bounce flash are in their normal conditions.
FIG. 2B is a perspective view of the strobo arranged in accordance with the present invention, wherein the bounce flash is in a normal condition and the divergent angle of a flash light is changed by the narrow angle.

FIG. 2A and FIG. 2B are perspective views of the complete strobo assembld from the abovementioned structure. FIG. 2A shows a strobo in normal photographing and normal divergent angle conditions, that is, the variable mechanism for establishing the angle of divergence of the flashed light and for achieving bounce are in their normal positions.

FIG. 2B shows the strobo in a normal photographing but narrow divergent angle condition, wherein the variable mechanism for establishing the angle of divergence of the flashed light is shifted from the normal position of FIG. 2A to a different position wherein lens 5 is extended.

Figure 3:
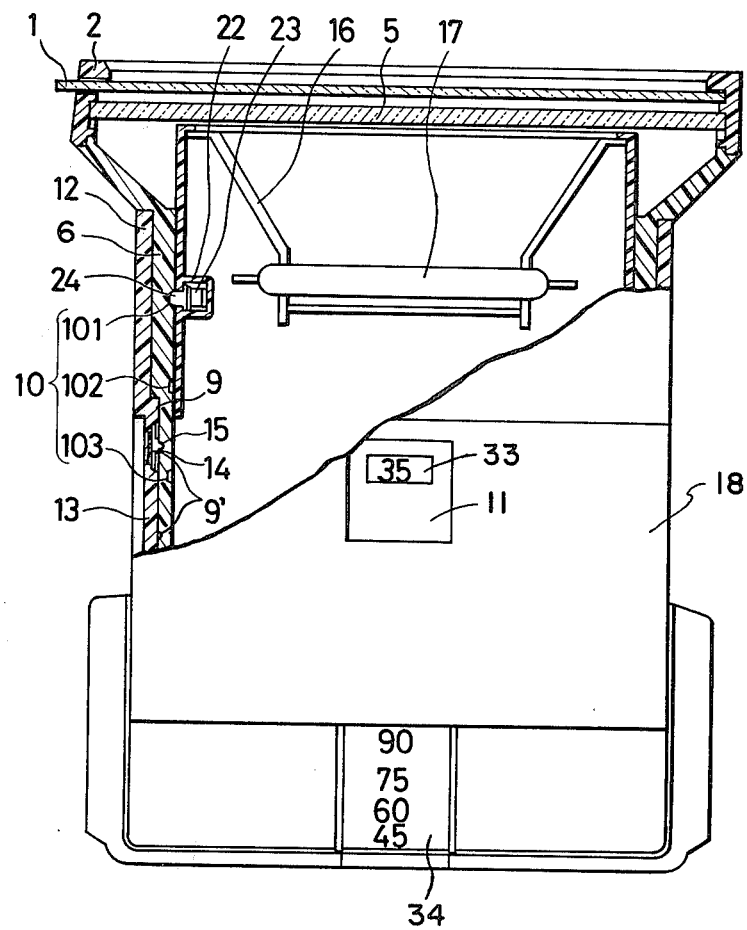
FIG. 3 is a fragmentary top view of the strobo arranged in accordance with the present invention.
Figure 4:
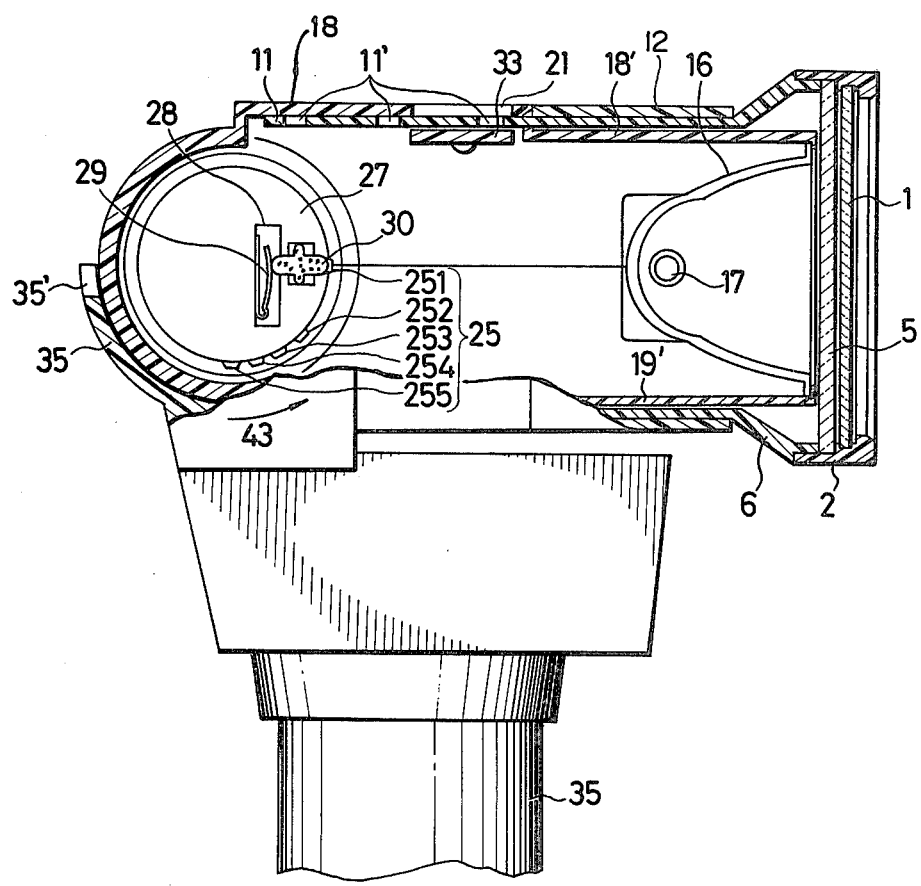
FIG. 4 is a fragmentary side view of the strobo arranged in accordance with the present invention.

The numerals employed in FIG. 2A and FIG. 2B correspond to those of FIG. 1. FIG. 3 is a fragmentary top view illustrated in the strobo of FIG. 2A and FIG. 2B, and FIG. 4 is a fragmentary side view of the strobo.

The variable mechanism for establishing the angle of divergence of the flashed light now will be described referring to FIGS. 1-4. The first molding 6 is slidably movable along an optical axis L to displace the fresnel lens 5, which is disposed in front of the light source between the cover 2 and the slidable molding 6. The movement of the first slidable molding 6 is controlled by the click pin 24 disposed at the front part 19' of the main molding 19 and by the detent notches 10 of the click guide lever 8 of molding 6. Their disposition is, as shown in FIG. 3, such that the tip of the click pin 24 is detained in a selected one of the three detent notches 101, 102 and 103 by means of the spring force of the click spring 23.

Therefore, the first slidable molding 6 can be displaced from the position shown in FIG. 3 (equivalent to the normal position shown in FIG. 2A) along a direction of an arrow 42 in FIG. 2B into other positions as established by the detent notches 102 and 103. FIG. 2B shows the position of molding 6 with the click pin 24 engaging the detent notch 102. In accordance with the embodiment of the present invention illustrated, the strobo has three different angles of divergence of flashed light. The divergent angle of the light from the flash discharge tube 17 is varied when the position of the fresnal lens 5 in relation to the flash discharge tube 17 changes due to displacement of the first slidable molding 6, and in this case the divergent angle becomes small when the distance between the fresnel lens 5 and the flash discharge tube 17 is made large.

The three different divergent angles are shown by numerals, letters, etc., which indicate the focal length of the camera lens usuable for the corresponding divergent angle. This indication on the indication plate 33 can be observed through the indication window 21 of the main molding 18 and through the indication windows 11' of the lever 11, as shown in FIG. 3.

The second slidable molding 12 provided outside the first slidable molding 6 is to prevent the first molding 6 from shaking as a result of the slide action. The slide action is controlled by the click pin 15 (which has a resilient force and which is located in notch 14 of in the slidable control arm 13) and by detent notches 9' formed in the groove 9 of the click guide lever 8 of the first slidable molding 6. The dispositions of the notch 14, the click pin 15, the click guide lever 8, the groove and the detent notches 9' are shown in FIG. 3.

The intervals between detent notches 101 and 102, and between notches 102 and 103, respectively, are equivalent to the intervals between the detent notches 9'.

When second molding 12 slidably moves and stops in a position where the click pin 24 is detained at the detent notch 103, the first slidable molding 6 is at the third stage position. At this, the click pin 15 is at the corresponding detent notch 9' and the projection 13' of the slidable control arm 13 is hooked at the slot 19" of the main molding 19.

The bounce mechanism of the strobo of the present invention will be described referring to FIG. 4. The bounce mechanism, that is, the direction of the flashed light, is controlled by the click pin 30 and the click spring 29 disposed at the recess 28 of the rotation guide disk 27, and by the detent notches 25 formed in the main molding 19. The direction of the flashed light from the strobo is therefore determined by the relative dispositions of the click spring, the click pin and the detent notch, as in the case of the variable mechanism for establishing the divergent angle of the flashed light.

The rotation guide disk 27 is fixed by the screws 36 to the main molding 35 and the position of the click pin 30 shows almost no change in FIG. 4. The direction of the flashed light is changed by rotating the main molding 19 about the rotation guide disk 27. That means, the main molding 19 can be rotated in the counterclockwise direction, as shown by an arrow 43 in FIG. 4, in five stages as determined by the detent notch 251, 252, 253, 254 and 255. Accordingly, five different directions of the flashed light from the strobo are obtainable. These five directions are defined by the rotational angles of the main molding 19 from the position shown in FIG. 4. The direction of the flashed light can be easily confirmed by the angle mark on the indication mark seal 34 attached to the outside face of the main molding 18 through which is viewable a display opening 35' in the main molding 35.

Additionally, since the strobo in accordance with the present invention includes the panel slot 3 in the cover 2, it is possible to obtain several effects by inserting various panels 1 in the slot 3 in front of the flash light source of the strobo. For example, the panel 1 may be a wide panel, a color temperature conversion panel, etc.

What is claimed is:

1. A photographic flash device comprising:
a first body housing a light source;
a second body rotatably connected to said first body;
a first detent mechanism for selectively positioning the first and second bodies at predetermined rotational positions with respect to one another, said detent mechanism including: a rotation guide disk which is rotatably mounted within a circular opening in said first body and secured to side wings of said second body, and first click stop means provided between said rotation guide disk and said circular opening;

a first molding slidably movable with respect to said first body, said molding supporting a fresnel lens in front of said light source; and connection means provided with a second detent mechanism for selectively positioning the first body and the first molding at predetermined positions relative to one another whereby the distances between the light source and the fresnel lens are varied, said connection means and second detent mechanism including: click guide levers which project from said first molding and which are provided with multiple detent notches, said click guide levers being received within slots provided in said first body, a second molding surrounding the first molding and relatively movable with respect thereto to support the first molding as it is moved relative to the first body, said second molding being provided with slidable control arms adapted to pass through said slots to extend within said first body, and second click stop means provided on said control arms and operatively related with said multiple detent notches of said first molding.

2. A photographic flash device according to claim 1, wherein said first molding includes a slot for receiving an optical panel and supporting said panel in front of the light source.

3. A photographic flash device according to claim 1, further comprising:

a first indication means observable through an opening in said first molding for providing an indication of the divergent angle of light from said source passing through said lens; and a second indication means on one of said bodies for indicating the direction of light from said source as determined by the relative positions of said first and second bodies.

* * * * *